(12) United States Patent
Kozinski

(10) Patent No.: US 6,701,745 B1
(45) Date of Patent: Mar. 9, 2004

(54) AIR CONDITIONING SYSTEM UTILIZING AT LEAST ONE EVAPORATOR WITH CONTINUOUS REFRIDGERANT FLOW THROUGH AN AUXILIARY UNIT DURING SHUT OFF

(76) Inventor: Richard C. Kozinski, 27671 Dowland, Warren, MI (US) 48092

(*) Notice: Subject to any disclaimer, the term of this patent is extended or adjusted under 35 U.S.C. 154(b) by 0 days.

(21) Appl. No.: 10/209,512

(22) Filed: Jul. 31, 2002

Related U.S. Application Data

(60) Provisional application No. 60/310,289, filed on Aug. 6, 2001.

(51) Int. Cl.[7] ............................. F25B 43/00; B60H 1/32
(52) U.S. Cl. ........................................... 62/503; 62/244
(58) Field of Search .................. 62/503, 244, 500, 62/509, 512, 470, 471, 474, 475; 210/285; 29/902

(56) References Cited

U.S. PATENT DOCUMENTS

| | | | |
|---|---|---|---|
| 5,493,875 A | | 2/1996 | Kozinski ................. 62/503 |
| 5,553,457 A | * | 9/1996 | Reznikov ................ 62/81 |

* cited by examiner

*Primary Examiner*—Chen Wen Jiang
(74) *Attorney, Agent, or Firm*—Rader, Fishman & Grauer, PLLC

(57) ABSTRACT

This invention relates to a dual evaporator air conditioning system that limits refrigerant recirculation. This system includes an accumulator, a compressor, a condenser, front and rear evaporators, and an eductor assembly. Alternative accumulators are also disclosed for use with dual and single evaporator systems.

14 Claims, 5 Drawing Sheets

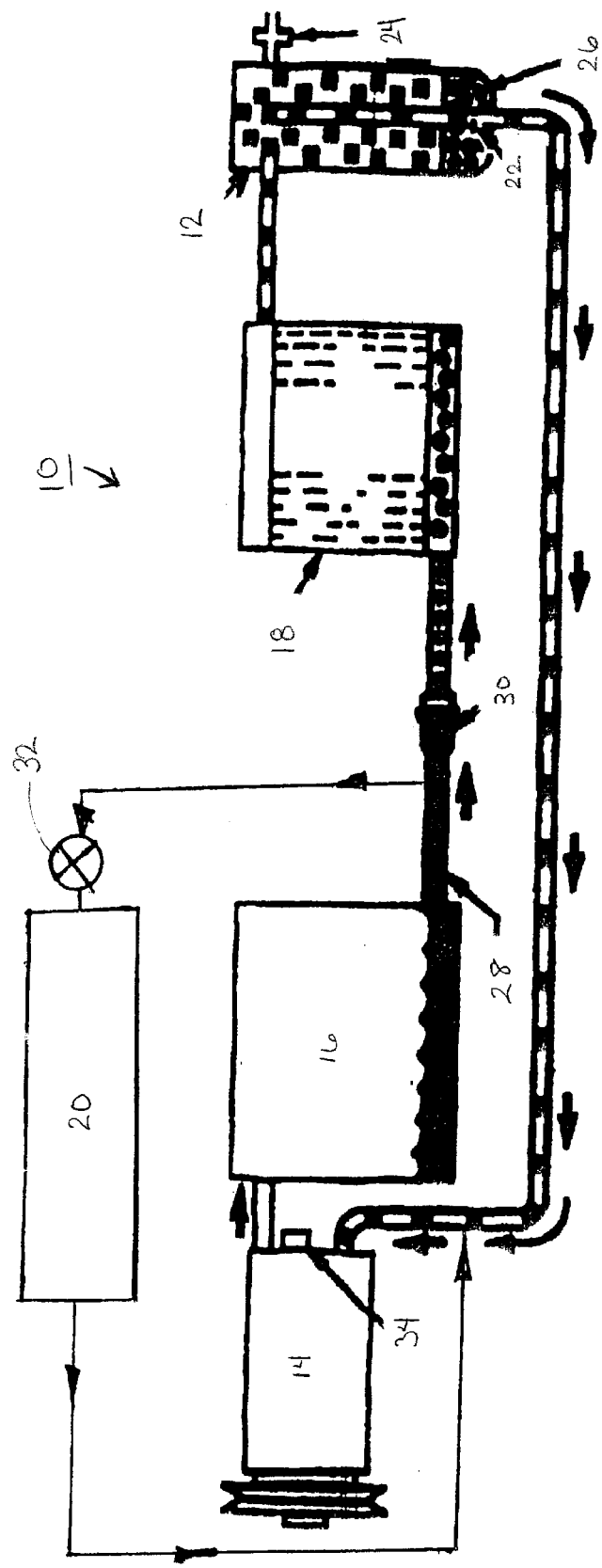

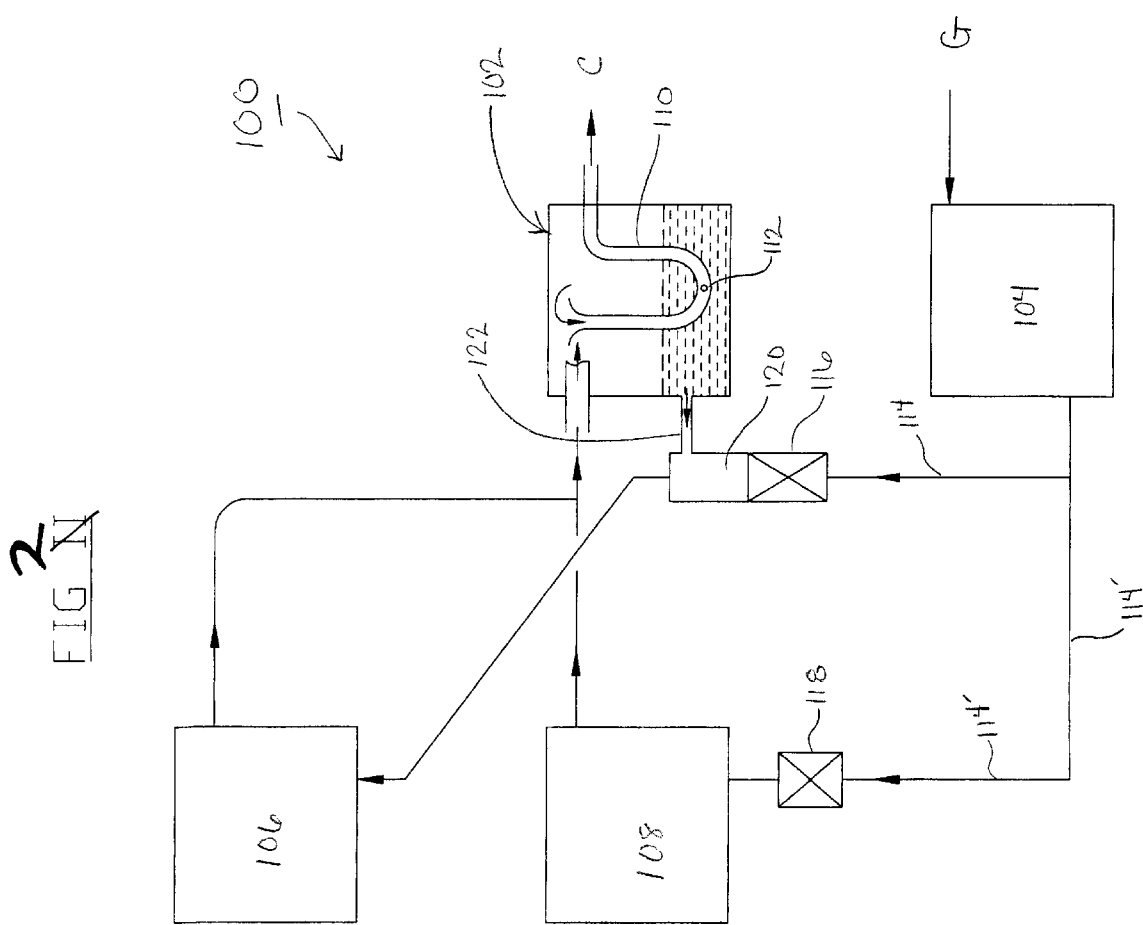

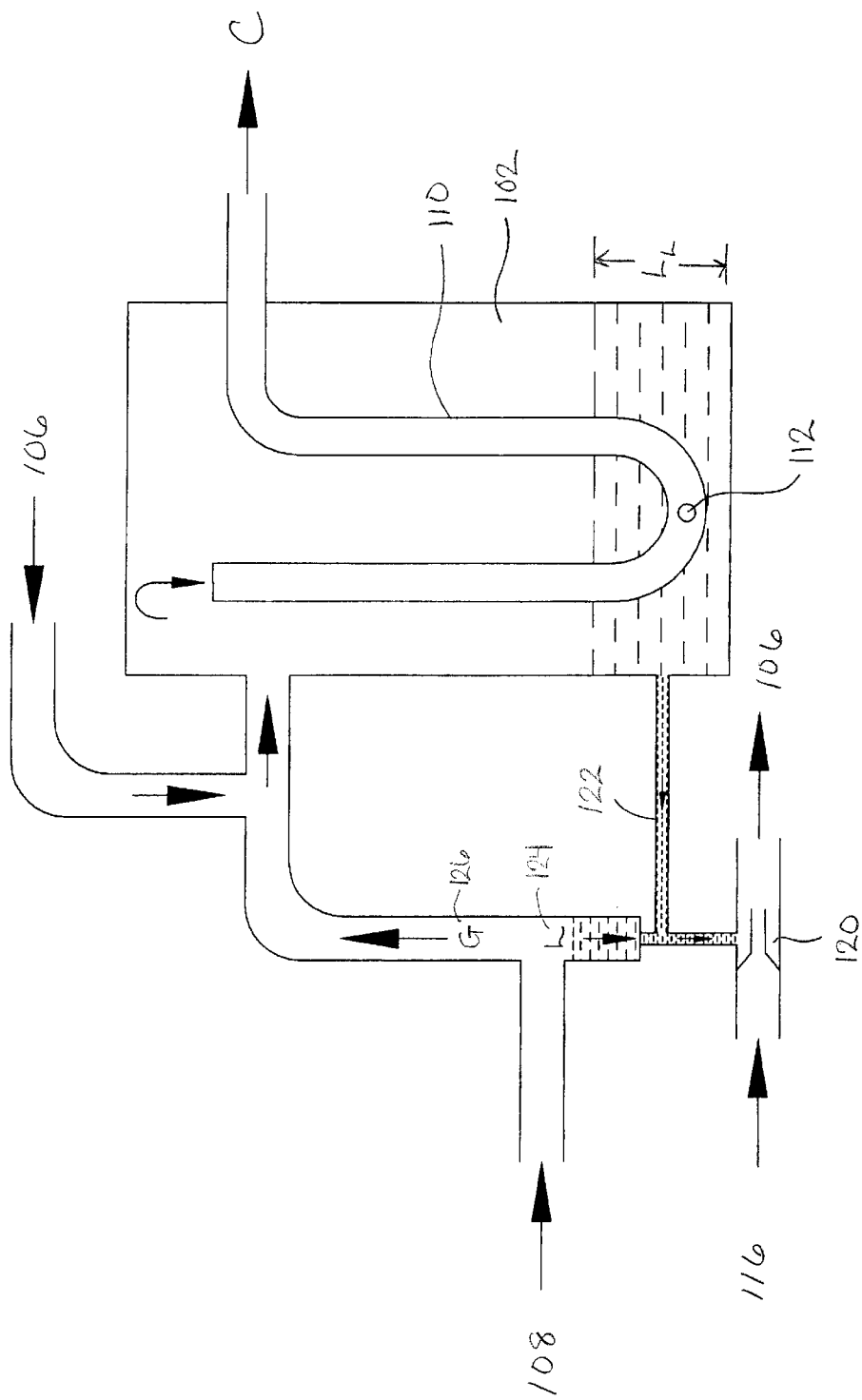

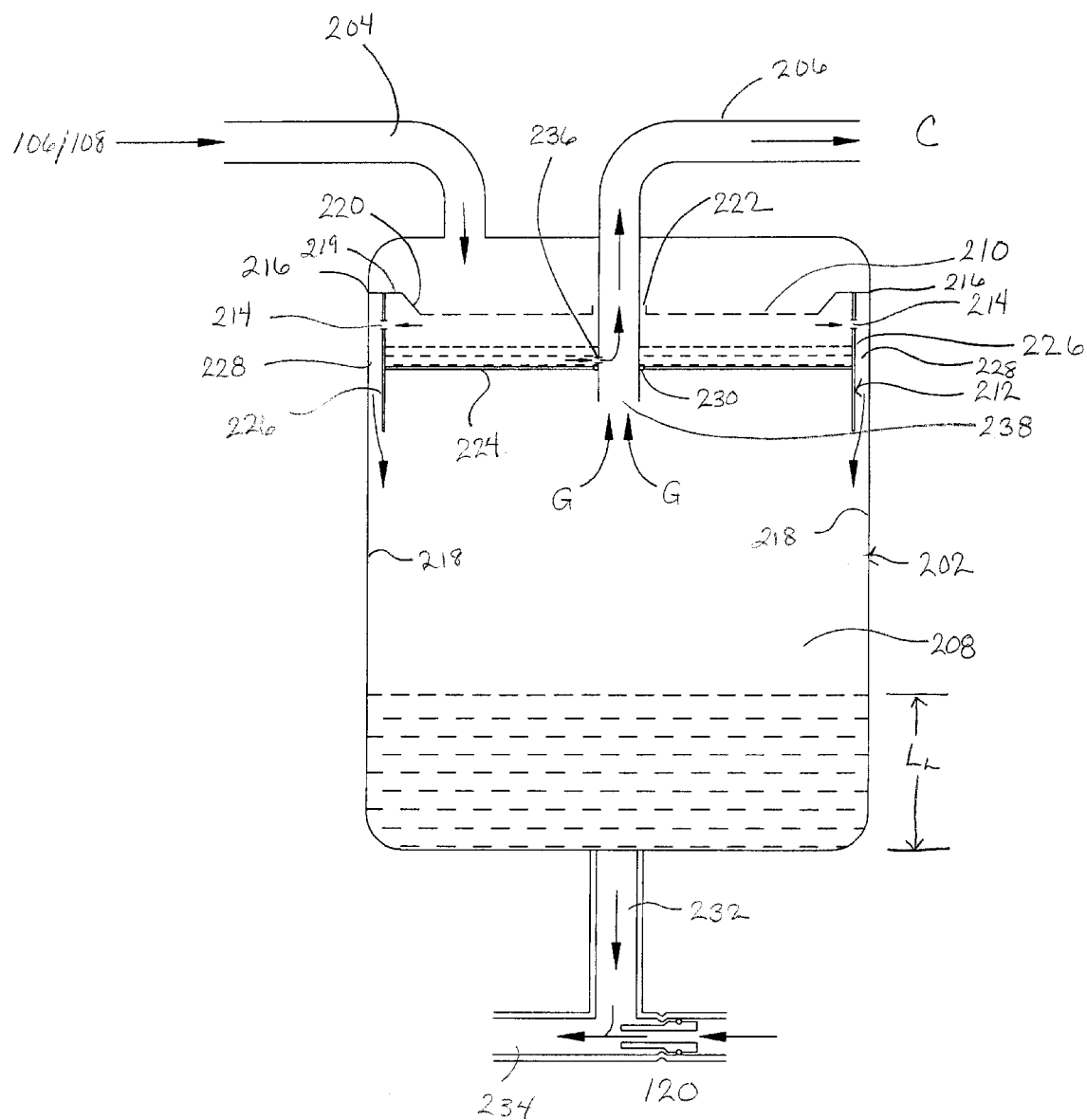

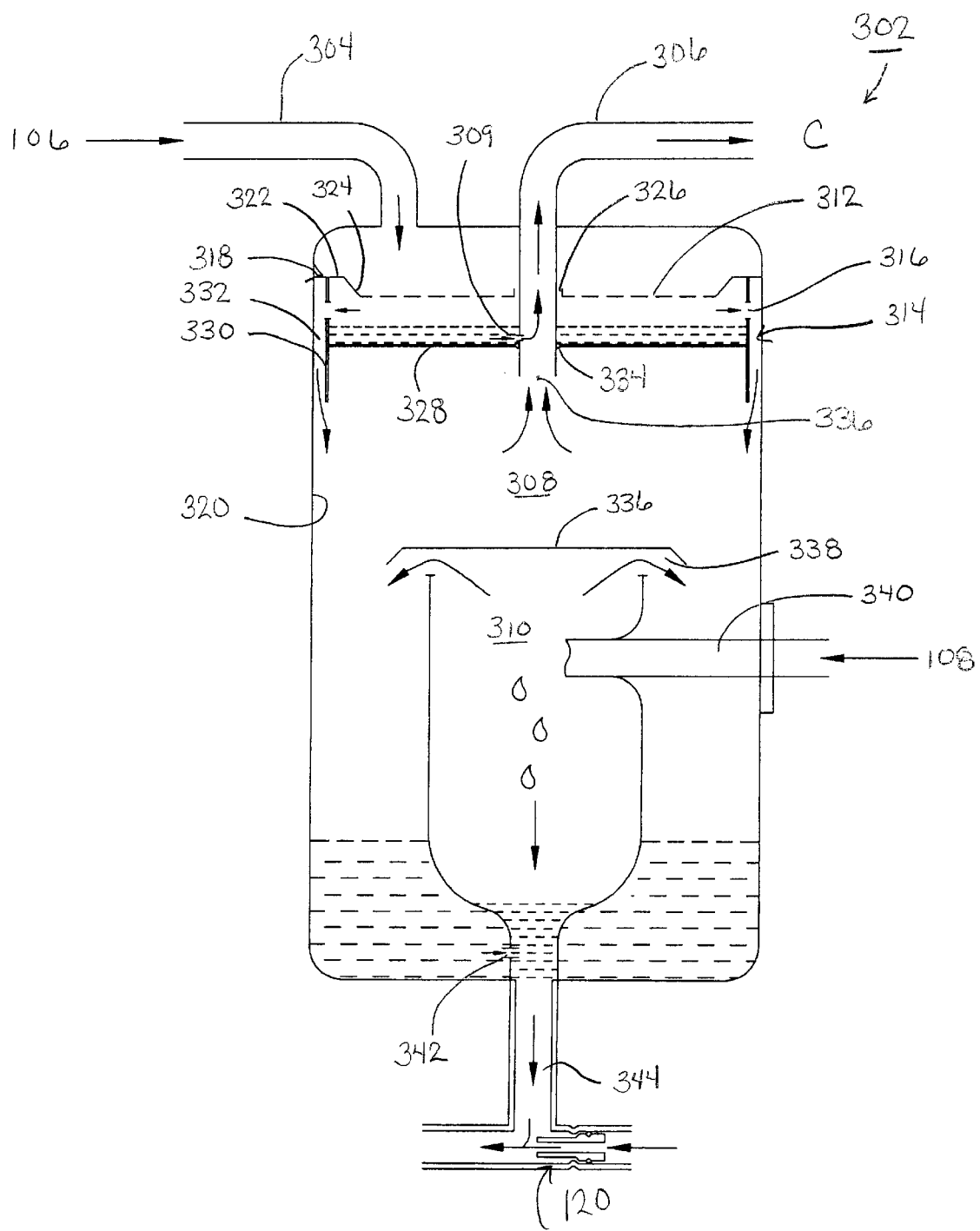

AIR CONDITIONING SYSTEM UTILIZING AT LEAST ONE EVAPORATOR WITH CONTINUOUS REFRIDGERANT FLOW THROUGH AN AUXILIARY UNIT DURING SHUT OFF

RELATED APPLICATION

This application claims priority to U.S. Provisional Application Serial No. 60/310,289 filed Aug. 6, 2001 entitled "AIR CONDITIONING SYSTEM UTILIZING TWO EVAPORATORS WITH CONTINUOUS REFRGERANT FLOW THRU AUXILIARY UNIT WHEN SHUT OFF" hereby incorporated by reference in its entirety.

TECHNICAL FIELD

The present invention relates to refrigeration systems that utilize at least one evaporator and provides for continuous refrigerant flow during shut off of evaporated airflow.

BACKGROUND OF THE INVENTION

Most vehicle air conditioning systems in use today utilize a suction accumulator to store and release refrigerant as required by operating conditions, and to separate incoming gas and liquid mixture. Known vehicle air conditioning systems include a compressor that is engine driven or driven by an electric motor, at least one evaporator and a condenser operatively connected together within the system. A mechanism to control refrigerant flow is typically provided between the evaporator and condensor to insure that the system will effectively operate under variable vehicle speed and load conditions. Known examples of such control mechanisms include a fixed capillary or orifice tube.

For those applications that have both a front and rear evaporator units, a fixed orifice tube expansion device is typically used with for a front evaporator unit while the rear evaporator unit utilizes a thermostatic expansion valve and flows the suction gas directly to the compressor inlet line. An example of such a system is shown in FIG. 1.

As such known systems, compressor lubrication oil is circulated with the system refrigerant during operation but a problem of oil trapping occurs when the rear unit blower is shut off (common mode). Even with a small bleed thru the rear thermostatic expansion valve (many use this) the oil separates in the rear evaporator and the low mounted rear suction line resulting in oil starvation to the compressor. Total shut-off of the rear liquid line does not solve the problem as refrigerant migration results in oil eventually ending up in the rear plumbing and coil.

If one were to simply dump liquid refrigerant into the suction accumulator from the rear evaporator at a rate greater than the oil bleed hole allows from the suction accumulator then in a short time a flow imbalance would occur wherein the front evaporator would progressively be starved since the condenser outflow would be greater than the inflow to the compressor, thus filling the accumulator. A new balance would result in severe starvation of the front evaporator and result in unsatisfactory air-cooling performance. This already occurs in production systems at certain high-speed high load conditions if adequate charge is trapped in the rear system with rear evaporator blower shut off. This problem is greatly aggravated with loss of some charge.

To aid the compressor durability of current dual systems, one approach has been to add a disproportionate large amount of oil to the system. However, this results in some deterioration of cooling performance due to more oil film on heat exchanger surfaces.

Accordingly, there is a need for an improved air conditioning system that does not require additional oil concentration and prevents front evaporator starvation during rear evaporator blower shut off conditions.

SUMMARY OF THE INVENTION

In one embodiment of the invention, an air conditioning system having dual evaporators solves the oil-trapping problem by allowing a continuous flow of rear evaporator refrigerant even with the rear evaporator airflow shut off. Essentially, continuous flow is achieved at an adequate rate to circulate oil to a suction accumulator where it can be returned to the compressor. Satisfactory front evaporator operation during this rear evaporator shut off is accomplished by use of an eductor assembly to circulate an adequate amount of refrigerant from the suction accumulator into an incoming feed line to the front evaporator to insure that the front evaporator is not starved. The rear evaporator may be provided with a fixed orifice tube, a variable orifice tube or a thermostatic expansion valve with an adequate bleed to return oil satisfactorily.

This invention also discloses suction accumulators for preventing oil trapping. In one embodiment, a U-tube is provided in the suction accumulator with an oil bleed hole being formed at the base of the U. An eductor conduit in communication with the suction accumulator directs liquid to an eductor assembly to feed the front evaporator unit. When the rear evaporator is shut off, the eductor assembly may also draw liquid from a rear suction line. Thus, reduced recirculation from the suction accumulator is achieved when the rear evaporator is operating to advantageously limit recirculation to prevent liquid-vapor separation problems in the suction accumulator and also limits the occurrence of oil dilution in the suction accumulator.

Alternative embodiments of a suction accumulator for use with a either a dual evaporator system or a single evaporator system are also disclosed. In one alternative embodiment, a baffle assembly serves to limit the liquid level above an oil bleed hole to prevent too much liquid bleed from the accumulator. In another alternative embodiment, two chambers are provided in the suction accumulator, each chamber having a baffle assembly.

BRIEF DESCRIPTION OF THE DRAWINGS

The features and inventive aspects of the present invention will become more apparent upon reading the following detailed description, claims, and drawings, of which the following is a brief description:

FIG. 1 is a schematic drawing of a prior art vehicle air conditioning system.

FIG. 2 is a schematic drawing of the vehicle air conditioning system in accordance with the present invention.

FIG. 3 is a schematic drawing of the vehicle air conditioning system of FIG. 2 showing limited recirculation.

FIG. 4 is a schematic drawing of an alternative embodiment of an accumulator design for a vehicle air conditioning system.

FIG. 5 is a schematic drawing of a two chamber accumulator design for a vehicle air conditioning system.

DESCRIPTION OF THE PREFERRED EMBODIMENT

Referring now to FIG. 1, a prior art air conditioning system 10 is shown. System 10 includes a suction accumulator 12, a compressor 14, a condenser 16, a front evaporator 18 and a rear evaporator/blower unit 20. Accumulator 12 operates to store and release refrigerant as required by the operating conditions. Accumulator 12 also serves to separate incoming the incoming gas and liquid mixture in system 10. Accumulator 12 utilizes an oil bleed hole 22 to meter oil and liquid back to compressor 14. The amount of flow through bleed hole 22 increases as the liquid level rises in accumulator 12. However, increase in flow through bleed hole 22 degrades performance of system 10.

System 10 further includes a conventional pressure cycling switch 24 mounted on accumulator 12. A desiccant bag 26, as is known in the industry, is also provided in accumulator 12. A liquid line 28 between condenser 16 and front evaporator 18 is provided with an expansion tube or orifice 30. A thermostatic expansion valve 32 is provided between condenser 16 and rear evaporator 20. A pressure relief valve 34 is also provided and is mounted on compressor 14.

Referring now to FIG. 2, an air conditioning system 100 in accordance with the present invention is depicted. System 100 includes a suction accumulator 102, a condenser 104, a compressor (not shown), and front and rear evaporators 106 and 108, respectively. Suction accumulator 102 includes a U-tube 110 that has an oil bleed hole 112.

In system 100, a liquid conduit 114 is provided with either a fixed orifice tube or a variable orifice tube 116, which varies expansion flow area as a function of head pressure, feeds front evaporator 106. Liquid conduit 114 is also provided with either a fixed orifice tube or a variable orifice tube 118 leading to rear evaporator 108.

In accordance with the invention, during operation compressor C draws gas and some liquid refrigerant from suction accumulator 102. The gas is condensed and usually (but not always) sub cooled liquid from condenser 104 flows to both front and rear expansion devices 106 and 108. Rear evaporator 108 evaporates all or much of the liquid from this liquid gas mixture and refrigerant then flows to suction accumulator 102. At high rear evaporator load conditions the returning refrigerant will be superheated while some liquid would be present during low load operation or when the blower of rear evaporator 108 is shut off.

Front evaporator unit 106 is fed from the front expansion device 116 but also receives liquid from an eductor assembly 120, which is shown drawing liquid directly from suction accumulator 102, via an eductor conduit 122.

FIG. 3 is an alternative embodiment of the invention which reduces recirculation when rear evaporator 108 is in the on mode. This design advantageously limits recirculation to prevent liquid-vapor separation problems in accumulator 102 and reduces oil dilution in accumulator 102. When rear evaporator 108 blower is in the off operation, evaporator 108 will be returning a high percentage of liquid. This liquid will fall into conduit 124 (due to gravity) while gas flows to conduit 126 and into accumulator 102.

During operation of both front and rear evaporators 106 and 108, front fixed orifice valve (or variable orifice valve) 116 will be sized to adequately feed front evaporator 106 with some overfeed to make up for the oil bleed flow. Recirculation is limited to liquid flow L from connecting tube 122 when rear evaporator 108 is not producing returning liquid refrigerant. During rear evaporator 108 shut off, the liquid level $L_L$ in suction accumulator 102 drops because refrigerant of greater density will be in the rear coil and plumbing as compared rear evaporator 108 on operation. Adequate refrigerant charge must be set at this condition. The following example will help explain the invention flow characteristics.

In today's system the split of refrigerant flow is approximately $\frac{1}{3}$ to rear and $\frac{2}{3}$ to front with the oil bleed flow approximately 10% of total flow. With rear evaporator off, system 100 total gas flow to compressor C will be reduced as only front evaporator 106 is evaporating liquid. This assumes equal front evaporator 106 load for this example. Assume a fixed orifice tube in the rear unit.

Since total flow out of condenser C is reduced, the flow out of front expansion device 116 will not be adequate to satisfy front evaporator 106 requirements. Thus, eductor assembly 120 must provide enough liquid to make up for this shortfall. Eductor assembly 120 may be designed to overfeed front evaporator 106, but performance and oil return will be satisfactory even with a slight underfeed. A new flow balance will be achieved with all oil being circulated back to suction accumulator 102 where it then flows to compressor C. An example of a suitable remote eductor assembly positioned downstream of an expansion device is shown in U.S. Pat. No. 5,493,875, incorporated herein by reference.

An example of the flow regime of this invention is as follows and included to help in understanding the operation of system 100. Assuming that rear evaporator 108 is in the shut off mode and that there is a total flow rate of 6.0 lb/min of R-134A refrigerant. Further, assume a 0.6 lb/min oil bleed flow and a $\frac{1}{3}$ to $\frac{2}{3}$ flow split. Accordingly, the rear orifice 118 flow is 2 lb/min and the front orifice 116 flow is 4 lb/min. Rear evaporator 108 produces 0.5 lb/min gas flow from expansion and ambient heat load. Front evaporator 106 must generate 4.9 lb/min to be in balance (4.9+0.5+0.6=6.0 lb/min) Because front orifice 116 only supplies 4.0 lb/min, eductor assembly 120 must supply 0.9 lb/min or more to achieve the required 4.9 lb/min of gas flow out of front unit 106.

Because rear evaporator 108 flow back is 1.5 lb/min of liquid it is adequate to supply front evaporator 106 eductor assembly 120 flow. In essence, system 100 provides two feed orifice tubes 116 and 118 in parallel to feed front evaporator 106 during rear evaporator 108 shut off. The relatively large resultant orifice tube size will result in some slight idle and low speed performance loss but will result in lower head pressure at road speeds as compared to today's production systems. Performance with both evaporator units 106 and 108 on should result in a gain since oil concentration will be lower.

FIG. 4 illustrates an alternative suction accumulator 202 design for use in system 100 having two evaporators 106 and 108. Suction accumulator 202 may also be used in single evaporator systems. Suction accumulator 202 includes an entrance conduit 204 from evaporator(s) 106/108, and gas conduit 206 leading from the interior of a chamber 208 of suction accumulator 202 to compressor C. A porous screen 210 is positioned within chamber 208. A baffle member 212 is also included. Baffle member 212 is generally H-shaped and includes radially formed baffle openings 214.

Screen 210 is sized to be generally the same size as chamber 208 such that a periphery 216 is contacting an interior wall 218 of chamber 208. In one embodiment, periphery 216 includes a flange member 219 that includes a downwardly sloping portion 220 to direct fluid through screen 210. An access aperture 222 is formed through screen 210 for gas conduit 206 to extend through.

Baffle member 212 includes a generally planar base portion 224 and a generally transversely extending peripheral wall portion 226. Base portion 224 is generally sized to be slightly smaller than chamber 208 such that wall portion 226 cooperates with interior wall 218 to form a radial passageway 228 for gas and liquid to flow into chamber 208 through baffle openings 214. An access aperture 230 is formed through base portion 224 for gas conduit 206 to extend through. There is preferably an interference fit between access aperture 222 and base portion 224 such that refrigerant entering into suction accumulator 202 may only flow through baffle openings 214 and oil bleed hole 236. Access aperture 222 may also be provided with a seal.

A discharge port 232 is also provided that leads from chamber 208. Discharge port 232 opens into a liquid line 234 adjacent an eductor assembly 120.

Suction accumulator 202 serves to limit the liquid level above an oil bleed hole 236 formed in gas inlet 206. In systems using dual evaporators, when both evaporators are operating, the liquid level may be substantially above the oil bleed hole (approximately 2 inches above). A high liquid level causes too much liquid bleed into the system in this condition, resulting in decreased cooling performance and increased total flow. This undesirably leads to increased compressor horsepower.

During operation, refrigerant enters suction accumulator 202 through entrance conduit 204. The flow is diffused by screen 210, which also filters out debris. Baffle member 212 captures separated liquid refrigerant and oil. Gas and liquid flow out of baffle openings 214. Preferably, baffle openings 214 are formed so as to be angled to spin the liquid onto interior wall 218 and through passageway 228. Liquid above base portion 224 is drawn into gas inlet 206 via oil bleed hole 236. Separated gas is also drawn into gas conduit 206 at opening 238. Because baffle openings 214 are positioned above base portion 224, the liquid level over oil bleed hole 236 is advantageously limited. Accordingly, the air conditioning system becomes less sensitive to excess charge affecting cooling performance especially at idle conditions. Further, oil bleed hole size may be increased resulting in improved low charge oil return to the compressor C.

FIG. 5 is another alternative suction accumulator 302 that may be used in air conditioning systems having either single or dual evaporators. Suction accumulator 302 includes an entrance conduit 304 leading from a front evaporator 106 and into accumulator 302 and a gas conduit 306 leading from a first chamber 308 formed in accumulator 302. Gas conduit 306 further includes an oil bleed hole 309. A second chamber 310 is formed in first chamber 308. Similar to suction accumulator 202, suction accumulator 302 also includes a porous screen 312 positioned within first chamber 308. A first baffle member 314 is also included having radial openings 316.

Screen 312 is sized to be generally the same size as first chamber 308 such that a periphery 318 is contacting an interior wall 320 of first chamber 308. In one embodiment, periphery 316 includes a flange member 322 that includes a downwardly sloping portion 324 to direct fluid through screen 312. An access aperture 326 is formed through screen 312 for gas conduit 306 to extend through.

First baffle member 314 includes a generally planar base portion 328 and a generally transversely extending peripheral wall portion 330. Base portion 328 is generally sized to be slightly smaller than first chamber 308 such that wall portion 330 cooperates with interior wall 320 to form a radial passageway 332 for gas and liquid to flow into first chamber 308 through baffle openings 316. An access aperture 334 is formed through base portion 328 for gas conduit 306 to extend through. There is preferably an interference fit between access aperture 334 and base portion 328 such that liquid entering into suction accumulator 302 may only flow through baffle openings 316. Access aperture 334 may also be provided with a seal.

Second chamber 310 includes a second baffle member 336 that serves to direct gas out of second chamber openings 338. A second inlet conduit 340 opens into second chamber 310. Second chamber 310 also includes a liquid bleed hole 342 and an eductor assembly inlet conduit 344.

Suction accumulator 302 limits the liquid level above oil bleed hole 309 similar to suction accumulator 202 and also limits recirculation when both front and rear evaporators 106 and 108 are operating. This recirculation is limited to liquid bleed hole 342 when second inlet conduit 340 is returning gas only from rear evaporator 108. Accordingly suction accumulator 302 operates similar that suction accumulator 102. While no U-tube is employed with suction accumulator 302, it is understood that one could be easily incorporated to suction accumulator 302 as described in my previously filed provisional application filed on Aug. 21, 2001, U.S. Serial No. 60/313,943, incorporated herein by reference.

In operation, refrigerant enters suction accumulator 302 through entrance conduit 304. The flow is diffused by screen 312, which also filters out debris. First baffle member 314 captures separated liquid refrigerant and oil. Gas and liquid flow out of baffle openings 316. Preferably, baffle openings 316 are formed with a swirling member that spins the liquid onto interior wall 320 and through passageway 332. Liquid above base portion 328 is drawn into gas conduit 306 via oil bleed hole 309. Separated gas is also drawn into gas conduit 306 at opening 336. Because baffle openings 316 are positioned above base portion 328, the liquid level over oil bleed hole 309 is advantageously limited. Accordingly, the air conditioning system becomes less sensitive to excess charge affecting cooling performance especially at idle conditions. Further, oil bleed hole size may be increased resulting in improved low charge oil return to the compressor C.

Rear evaporator 108 discharges refrigerant into second chamber 310 via second inlet conduit 340. If rear evaporator 108 is shut off, refrigerant entering into second chamber 310 will have a high percentage of liquid that will separate due to gravity. Accordingly, liquid will flow downward into eductor assembly inlet conduit 344. Liquid that is entrained between interior wall 320 and second chamber 310 flows through liquid bleed hole 342. Thus, eductor assembly inlet conduit 344 receives liquid from both second chamber 310 and liquid bleed hole 342.

The gas portion of the refrigerant from rear evaporator 108 flows upward and out of second chamber 310 via second chamber opening 338 into first chamber 308. Once in first chamber 308 it is drawn through opening 336 and into gas conduit 306. When liquid is returning from rear evaporator 108, more liquid will be available for recirculation. However, when no liquid refrigerant is returned from rear evaporator 108, then eductor assembly 120 will only obtain liquid refrigerant from liquid bleed hole 342. In operation, some separated oil will flow from second chamber 310, as well.

While the invention has been specifically described in connection with certain specific embodiments thereof, it is to be understood that this is by way of illustration and not of limitation, and the scope of the appended claims should be construed as broadly as the prior art will permit.

What is claimed is:

1. An air conditioning system containing a refrigerant comprising:
   a compressor having an inlet and outlet;
   a condenser having an inlet and outlet;
   a front evaporator having an inlet and outlet;
   a front unit refrigerant control valve;
   an inlet conduit connecting said outlet of said front evaporator to said inlet of said compressor where the refrigerant returns to the compressor as a low pressure vapor;
   a discharge conduit connecting said outlet of said compressor to said condenser where upon removal of heat the vapor becomes a high pressure liquid refrigerant;
   a liquid conduit connecting said outlet of said condenser to said inlet of a rear evaporator, and said outlets of said front and rear evaporator connected to an accumulator having an inlet part and an outlet part, wherein said accumulator is connected to said inlet of said compressor; and
   an eductor assembly interposed between said front refrigerant control valve and said front evaporator.

2. The air conditioning system of claim 1, further including a rear unit refrigerant control valve.

3. The air conditioning system of claim 2, wherein said rear unit refrigerant control valve is one of a fixed orifice tube, a variable orifice tube or a thermostatic expansion valve.

4. The air conditioning system of claim 1, wherein said accumulator further includes a U-tube having an oil bleed hole formed therein.

5. The air conditioning system of claim 4, further including a connecting tube connecting said eductor assembly to said accumulator.

6. The air conditioning system of claim 5, wherein said connecting tube is positioned slightly higher than the height of said oil bleed hole in said U-tube.

7. The air conditioning system of claim 1, wherein said accumulator includes a first baffle member, a screen and an oil bleed hole formed in a compressor conduit leading to said compressor inlet to limit the liquid level in said accumulator above said oil bleed hole.

8. The air conditioning system of claim 7, wherein said first baffle member includes a base portion and a peripheral wall portion, said baffle member being sized to be slightly smaller than an interior wall defining said accumulator.

9. The air conditioning system of claim 8, wherein said peripheral wall portion further includes radially extending baffle openings, said peripheral wall cooperating with said interior wall to define a passageway for directing fluid and gas.

10. The air conditioning system of claim 8, wherein said base portion includes an access opening therethrough for receiving said compressor conduit.

11. The air conditioning system of claim 7, wherein said screen includes a flange formed around the periphery of said screen and an access opening adapted to receive said compressor conduit therethrough.

12. The air conditioning system of claim 7, wherein said accumulator includes a first chamber and a second chamber, said second chamber being positioned within said first chamber and operatively connected to said outlet of said rear evaporator, said second chamber including a liquid bleed hole opening to said first chamber.

13. The air conditioning system of claim 12, wherein said second chamber includes a second baffle member having radial openings therein.

14. The air conditioning system of claim 12, further including a connecting tube leading from said second chamber to said eductor assembly.

* * * * *